(12) United States Patent
Jan

(10) Patent No.: US 8,872,296 B2
(45) Date of Patent: Oct. 28, 2014

(54) CHIP MODULE STRUCTURE FOR PARTICLES PROTECTION

(71) Applicant: LarView Technologies Corporation, Yangmei (TW)

(72) Inventor: Shin-Dar Jan, Hsinchu (TW)

(73) Assignee: Lite-On Technology Corporation, Taipei (TW)

(*) Notice: Subject to any disclaimer, the term of this patent is extended or adjusted under 35 U.S.C. 154(b) by 0 days.

(21) Appl. No.: 13/666,093

(22) Filed: Nov. 1, 2012

(65) Prior Publication Data

US 2014/0117479 A1    May 1, 2014

(51) Int. Cl.
*H01L 31/0232* (2014.01)
*H01L 33/00* (2010.01)
*H01L 31/0203* (2014.01)
*H01L 27/146* (2006.01)

(52) U.S. Cl.
USPC ............. 257/432; 257/98; 257/434; 257/435; 257/E33.056; 257/E33.057; 257/E33.058; 257/E33.073

(58) Field of Classification Search
USPC ................... 257/98, 432, 435, E33.073, 434, 257/E33.056, E33.057, E33.058
See application file for complete search history.

(56) References Cited

U.S. PATENT DOCUMENTS

| | | | |
|---|---|---|---|
| 7,423,334 B2* | 9/2008 | Tu et al. | 257/680 |
| 7,460,317 B2* | 12/2008 | Webster et al. | 359/811 |
| 7,511,261 B2* | 3/2009 | Hsin et al. | 250/239 |
| 7,839,585 B2* | 11/2010 | Hou et al. | 359/824 |
| 8,013,410 B2* | 9/2011 | Imai et al. | 257/432 |
| 2002/0154239 A1* | 10/2002 | Fujimoto et al. | 348/340 |
| 2005/0168846 A1* | 8/2005 | Ye et al. | 359/819 |
| 2006/0141674 A1* | 6/2006 | Li et al. | 438/123 |
| 2006/0222300 A1* | 10/2006 | Frenzel et al. | 385/88 |
| 2008/0246845 A1* | 10/2008 | Chan | 348/207.2 |
| 2009/0034075 A1* | 2/2009 | Murakami | 359/511 |
| 2009/0160998 A1* | 6/2009 | Fukamachi et al. | 348/340 |
| 2010/0025792 A1* | 2/2010 | Yamada et al. | 257/432 |
| 2010/0073533 A1* | 3/2010 | Yano et al. | 348/294 |
| 2010/0141825 A1* | 6/2010 | Kim et al. | 348/340 |
| 2011/0007203 A1* | 1/2011 | Avron et al. | 348/360 |
| 2011/0317287 A1* | 12/2011 | Aoki et al. | 359/813 |
| 2012/0068292 A1* | 3/2012 | Ikeda et al. | 257/432 |
| 2012/0104536 A1* | 5/2012 | Seo et al. | 257/459 |
| 2012/0105713 A1* | 5/2012 | Luan | 348/374 |
| 2012/0257075 A1* | 10/2012 | Kamada | 348/222.1 |
| 2013/0049049 A1* | 2/2013 | Choi | 257/98 |
| 2013/0072615 A1* | 3/2013 | Muro et al. | 524/406 |
| 2013/0222685 A1* | 8/2013 | Topliss et al. | 348/373 |
| 2013/0314810 A1* | 11/2013 | Sekimoto et al. | 359/823 |
| 2014/0061438 A1* | 3/2014 | Rohde et al. | 250/208.1 |

* cited by examiner

*Primary Examiner* — Ida M Soward
(74) *Attorney, Agent, or Firm* — Li & Cai Intellectual Property (USA) Office

(57) ABSTRACT

The present invention provides a chip module structure for particles protection. The structure includes a substrate. A chip is configured on the substrate, with a sensing area. A holder is disposed on the substrate, wherein the holder has a first rib. A transparent material is disposed on the holder, substantially aligning to the sensing area. A lens holder is disposed on the holder, and a lens is configured on the lens holder, substantially aligning to the transparent material and the sensing area. The lens has a second rib, wherein the second rib is disposed corresponding to the first rib for blocking particles entering into the chip module structure.

18 Claims, 3 Drawing Sheets

CHIP MODULE STRUCTURE FOR PARTICLES PROTECTION

TECHNICAL FIELD

The present invention generally relates to a semiconductor device module structure, more particularly, to a chip module structure for particles protection by utilizing a specified design of a lens and a supporting holder to reduce the percentage for particles entering inside the surface of a transparent plate.

BACKGROUND

A traditional camera module includes an image sensor and one or more lens set. The lens set is disposed above the image sensor for the incident ray image mapping to the image sensor. Camera module with the image sensor can be applied to digital cameras, digital video recorders, mobile phones, smart phones, monitors and others electronic products with camera function.

For the camera module, which pixel size of the image sensor is smaller and smaller, dust to the impact of imaging quality is increasing significantly. In the current scheme of the camera module, there is no special design between the lens and the lens holder. Therefore, both the dust from outside or particles generated as the lens and the lens holder assembling, they will enter inside of the camera module through the gap between the lens and the lens holder, and affect the imaging quality of the camera module.

Therefore, based-on the shortcomings of prior arts, the present invention provide a newly chip module structure for particles protection for enhancing imaging quality of camera module.

SUMMARY OF THE INVENTION

Based-on the shortcomings of the above-mentioned, an objective of the present invention is to provide a chip module structure for particles protection to reduce the percentage of particles entering into a transparent plate.

Another objective of the present invention is to provide a chip module structure comprising a lens and a supporting holder with corresponding protrusion structure for particles protection to block the particles entering into the module structure.

According to an aspect of the present invention, the present invention provides a chip module structure for particles protection. The module structure comprises a substrate. A chip is configured on the substrate, with a sensing area. A first holder disposed on the substrate, wherein the first holder has a first protrusion structure. A transparent material is disposed on the holder, substantially aligning to the sensing area. A lens holder is disposed on the first holder, and a lens is configured on the lens holder, substantially aligning to the transparent material and the sensing area. The lens has a second protrusion structure, wherein the second protrusion structure is disposed opposite to the first protrusion structure for blocking particles entering into the chip module structure The holder has a groove structure formed therein for allowing the chip disposed therein, and a through hole structure for exposing the sensing area of the chip. The holder has a ring groove structure located at a side of the through hole structure for the transparent plate disposed thereon. The first protrusion structure and the second protrusion structure extend in opposite direction, and the second protrusion structure is separated by a spacing from the first protrusion structure in the horizontal direction. The chip is adhered to the substrate via a first adhesion layer, the holder adhered to the substrate via a second adhesion layer, and the lens holder adhered to the holder via a third adhesion layer. The substrate is a printed circuit board or a flexible printed circuit board. The lens holder is a plastic piece or an actuator, wherein the actuator includes a voice coil motor or a micro electro mechanical system.

The first protrusion structure is located on a top surface of the first holder, and the second protrusion structure is located on a bottom surface of a side of the lens.

The height of a bottom surface of the second protrusion structure is less than or equal to that of a top surface of the first protrusion structure.

BRIEF DESCRIPTION OF THE DRAWINGS

The components, characteristics and advantages of the present invention may be understood by the detailed descriptions of the preferred embodiments outlined in the specification and the drawings attached.

DETAILED DESCRIPTION

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

The present invention provides a chip module structure for particles protection to reduce or prevent some particles from entering inside of a transparent plate along the sidewall of an optical element (lens) by utilizing a first protrusion structure (rib) of a supporting holder relative (opposite) to a second protrusion structure (rib) of a lens, without affecting the imaging quality of a camera module. In other words, the module structure of the present invention utilizes a specified design for the lens and the supporting holder to effectively reduce or prevent micro particles from entering inside of the transparent plate along the gap between the lens and the lens holder (actuator), and thereby effectively enhancing the imaging quality of the image sensor.

Figure 1:
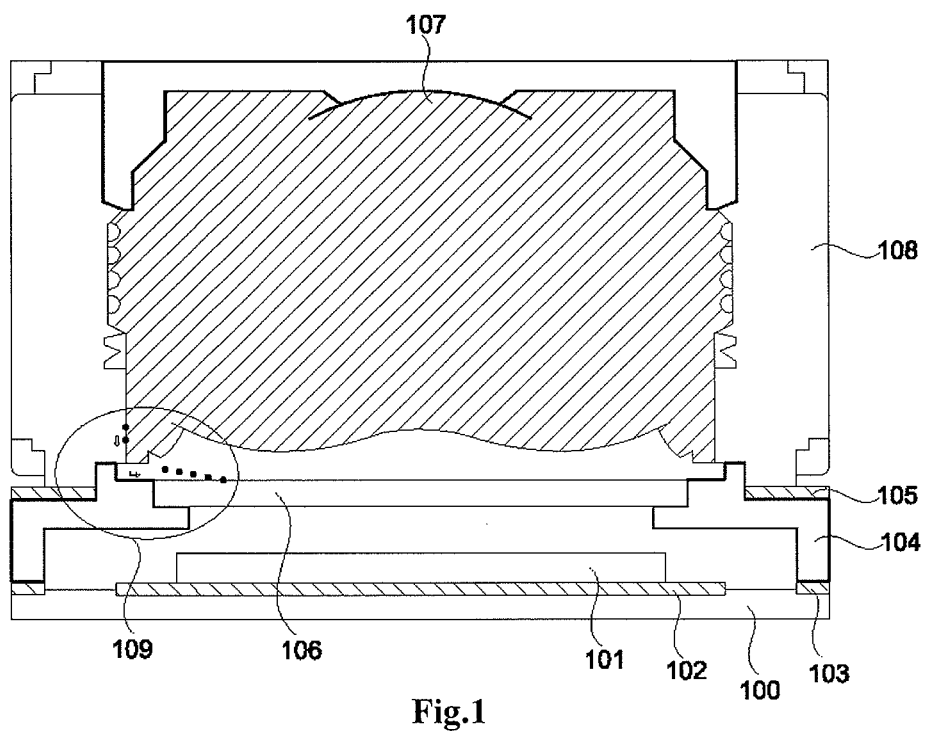
FIG. 1 illustrates a sectional view of a chip module structure by integrating a holder and an image sensor chip.

FIG. 1 shows a sectional view of a chip module structure by integrating a lens holder and an image sensor chip. As shown in FIG. 1, the lens holder integrates the transparent plate and the image sensor chip to be as a module structure with sensing function, which can be applied to a camera module of a mobile phone. The chip module structure comprises a substrate 100, a chip 101, a supporting holder 104, a transparent plate (material) 106, a lens 107 and a lens holder 108.

In the present invention, the lens holder 108 integrates the lens 107, the transparent plate 106, the supporting holder 104, the chip 101 and the substrate 100 to form a cubic module structure.

The lens holder 108 may be a plastic piece or an actuator adhered on the holder 104, and the holder 104 is adhered to the substrate 100 to complete the module structure of the present invention. For example, the actuator includes a voice coil motor (VCM) or a micro electro mechanical system (MEMS) structure. Currently, in the imaging apparatus, the voice coil motor is generally applied to drive lens of the camera module for focusing.

The chip 101 may be adhered on (to) the substrate 100 via a conductive layer or a non-conductive adhesion layer 102. The conductive layer may be as the adhesion layer 102 to form on the substrate 100. In one embodiment, material of the conductive layer includes a conductive paste or a conductive film, which may be formed as a pattern paste on the substrate by employing a printing or coating process. The conductive layer may be optically coated on the substrate 100. For example, the chip 100 is an image sensor chip which has a sensing area on the top surface and a contact pad formed thereon. The substrate 100 is a printed circuit board or a flexible printed circuit board. Size of the substrate 100 is larger than that of the chip 101 such that the chip 101 can be completely adhered on the substrate 100.

An adhesion layer 103 is formed on (side of) the substrate 100. The holder 104 is adhered on the substrate 100 via the adhesion layer 103, and the chip 101 is configured between the holder 104 and the substrate 100. The holder 104 has a groove structure formed therein for receiving or accumulating the chip 101, and a through hole structure with an opening area for exposing the sensing (active) area and the contact pad. Moreover, the holder 104a has a ring groove structure located at a side of the through hole structure, which has a space for the transparent plate 106 disposed thereon. That is, the holder 104 can support the transparent plate 106. The transparent plate 106 is for example a glass substrate or the plate made of a transparent material. The transparent plate 106 is located above the substrate 100 for covering the sensing area of the image sensor chip 101, and thereby creating a gap between the transparent plate 106 and the sensing area. The transparent plate 106 covers the sensing area of the image sensor chip 101 to reduce particles contamination for enhancing yield of the module structure. Size of the transparent plate 106 may be the same or larger than area of the sensing area.

The transparent plate (glass substrate) 106 may be round or square type. The transparent plate (glass substrate) 106 may be optionally coated infrared coating layer for filtering, such as infrared filter for filtering to a certain band of frequency by passing through the lens 107.

An adhesion layer 105 is formed on (side of) the holder 104. The bottom of the lens holder 104 is adhered on the supporting holder 104 via the adhesion layer 105. The lens 107 is fixed to the lens holder 108 for supporting the lens 107. Moreover, the lens holder 108 may be fixed to the supporting holder 104 for supporting the lens 107. In the module structure of this embodiment, the transparent plate 106 may be optionally disposed under the lens holder 108, and between the lens 107 and the chip 101. In other words, the lens 107 is substantially aligning to the transparent plate 106 and the chip 101.

As the module structure is assembled, between the lens holder 108 and the lens 107 may not be able to completely seal together, causing a slight gap (slit) at the seam therebetween. And, among the supporting holder 104, the transparent plate 106 and the lens 107 create an enclosed space. Therefore, a part of the fine particles 109 may move down along the slit (sidewall) between the lens 107 and the actuator or the lens holder 108, and further move into the transparent plate 106 in the above enclosed space, which may contaminate the surface of the transparent plate 106. This will affect the imaging quality of the image sensor chip 101. In other words, in the module structure of the FIG. 1, a part of fine particles may move along the slits (sidewall) between the lens 107 and the lens holder 108 of the upper half of the module structure into the transparent substrate 106 of the lower half of the module structure, and the fine particles will stay on the upper surface of the transparent plate 106, and thereby affecting the imaging quality of the image sensor chip 101 after the light passing through the transparent plate 106.

Figure 2:
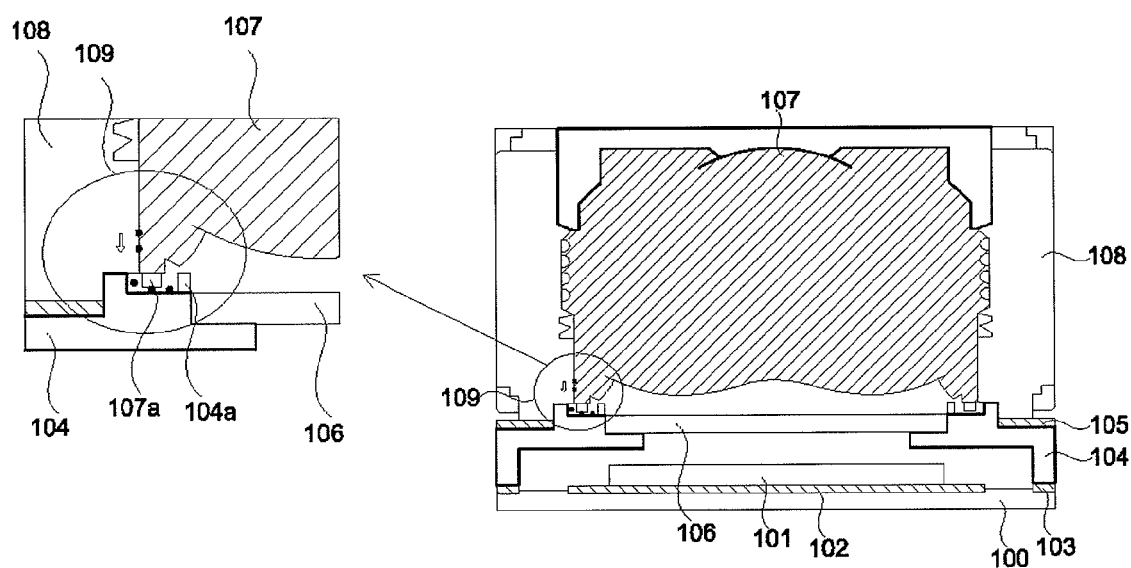
FIG. 2 illustrates a sectional view of a chip module structure for particles protection according to an embodiment of the present invention.

As shown in FIG. 2, it shows a sectional view of a chip module structure for particles protection according to an embodiment of the present invention. In this embodiment, the difference between the lens/the supporting holder of the FIG. 2 and the lens 107/the supporting holder of the FIG. 1 is that the supporting holder structure of the FIG. 2 includes the supporting holder 104 structure of the FIG. 1 and a first protrusion structure (rib) 104a, and the lens structure of the FIG. 2 includes the lens 107 structure of the FIG. 1 and a second protrusion structure (rib) 107a. Based-on the configuration of the second rib 107a relative (opposite) to the first rib 104a, it may prevent particles from entering into the module structure. For example, the second rib 107a is added onto the bottom surface (lower surface) of the lens 107, and the first rib 104a is added onto the top surface (upper surface) of the supporting holder 104a. The second rib 107a is located on the bottom of the side of the lens 107. The second rib 107a of the lens structure does not contact to the supporting holder 104, and the first rib 104a of the supporting holder structure does not contact to the lens 107 in order to avoid the upper portion of the module structure activating the lower portion of the module structure. The second rib structure 107a and the first rib structure 104a do not contact with each other. In one embodiment, the second rib structure 107a is separated by a spacing from the first rib structure 104a in the horizontal direction, while extends in opposite direction in the vertical direction. For example, the second rib 107a of the lens structure 107a extends (down) for close to the upper surface of the supporting holder 104, and the first rib 104a of the supporting holder structure extends (up) for close to the bottom of the lens 107. In this present embodiment, the second rib 107a of the lens structure does not contact to the supporting holder 104, and a gap exists there-between. Thus, a part of fine particles may move down along the slits (sidewall) between the lens 107 and the lens holder 108, and further enter into or pass through the gap between the bottom surface (lower surface) of the second rib 107a and the upper surface of the supporting holder 104. The second rib structure 107a is separated by a spacing from the first rib structure 104a in the horizontal direction, and therefore the fine particles may reach to the first rib 104a. However, since the first rib structure 104a extends towards the opposite direction in the vertical direction, the particles reaching to the first rib structure 104a will be blocked and without moving continuously to the transparent plate 106. These fine particles will remain in the side of the first rib 104a, without passing over the upper surface of the first rib 104a. Namely, these fine particles will be stayed between the second rib 107a and the first rib 104a. Therefore, the fine particles will not stay on the upper surface of the transparent plate 106, and thus can avoid the particles affecting the image sensor chip 101. The fine particles described above, for example, are dusts coming from outside or dusts generated as the lens and the lens holder assembling.

In one embodiment, the height of the bottom of the second rib 107a is less than or equal to that of the top of the first rib 104a.

In one embodiment, the second rib 107a and the lens 107 are integral structure, or the second rib 107a has a different manufacturing material form the lens 107 and fix to the bottom of the lens 107. Similarly, the first rib 104a and the supporting holder 104 are integral structure, or the first rib 104a has a different manufacturing material form the supporting holder 104 and fix to the top of the supporting holder 104.

In one preferred embodiment, the first rib 104a of the supporting structure is located at side of the transparent plate 106 to avoid contacting or covering the transparent plate 106, blocking the incoming light.

In the present invention, the second rib 107a of the lens structure and the first rib 104a of the lens structure are located outside the region of the holder 104 supporting the transparent plate 106.

Figure 3:
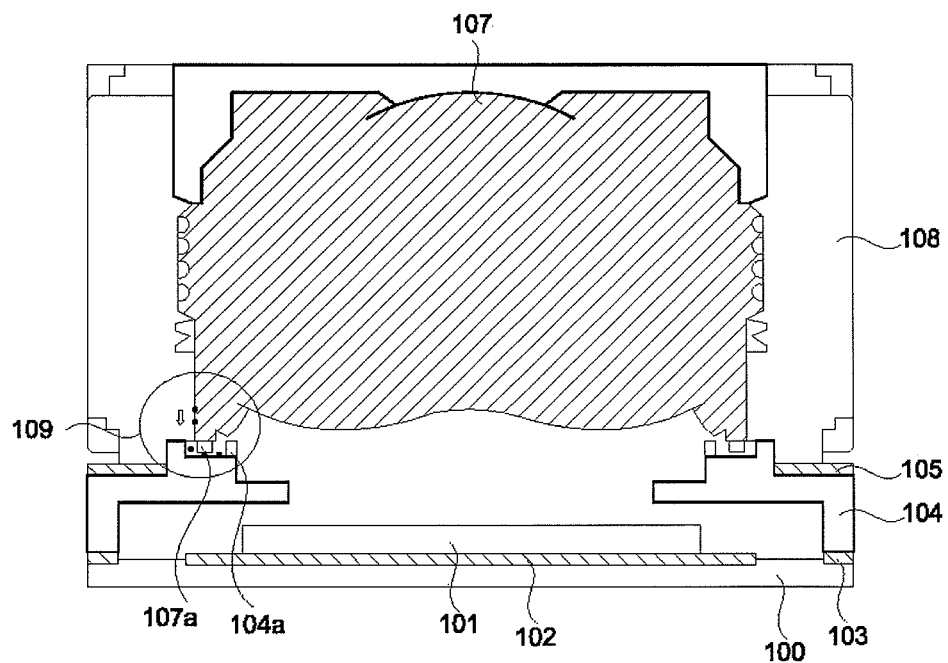
FIG. 3 illustrates a sectional view of a chip module structure for particles protection according to another embodiment of the present invention.

As shown in FIG. 3, it shows a sectional view of a chip module structure for particles protection according to another embodiment of the present invention. In this embodiment, the module structure does not include the transparent plate 106, or the transparent plate 106 integrated into the lens holder 18. Others configuration of the module structure may be referred to the FIG. 2.

In one embodiment of the present invention, the substrate 100 is a printed circuit board. Besides, the substrate 100 may be an organic substrate, and which material includes, for example epoxy type FR5 or FR4, or BT (Bismaleimide Triazine). Moreover, glass, ceramic and silicon may be as material of the substrate 100.

The foregoing descriptions are preferred embodiments of the present invention. As is understood by a person skilled in the art, the aforementioned preferred embodiments of the present invention are illustrative of the present invention rather than limiting the present invention. The present invention is intended to cover various modifications and similar arrangements included within the spirit and scope of the appended claims, the scope of which should be accorded the broadest interpretation so as to encompass all such modifications and similar structures.

What is claimed is:

1. A chip module structure for particles protection, comprising:
    a substrate;
    a chip configured on said substrate, with a sensing area;
    a supporting holder disposed on said substrate, wherein said supporting holder has a first protrusion structure; and
    a lens holder disposed on said supporting holder, and a lens configured on said lens holder, substantially aligning to said sensing area;
    wherein said lens has a second protrusion structure, wherein said second protrusion structure of said lens is disposed opposite to said first protrusion structure of said supporting holder, and wherein said first protrusion structure and said second protrusion structure extend in opposite direction,
    wherein said second protrusion structure of said lens does not contact with said supporting holder for blocking particles by a first side of said first protrusion structure of said lens, and
    wherein said first protrusion structure of said supporting holder does not contact with said lens and said second protrusion structure is separated by a spacing from said first protrusion structure in the horizontal direction for blocking particles by a second side of said first protrusion structure of said supporting holder entering into said chip module structure.

2. The module structure of claim 1, wherein said supporting holder has a groove structure formed therein for allowing said chip disposed therein, and a through hole structure for exposing said sensing area of said chip.

3. The module structure of claim 1, wherein said supporting holder has a ring groove structure located at a side of said through hole structure for a transparent plate disposed thereon.

4. The module structure of claim 1, wherein said chip is adhered to said substrate via a first adhesion layer, said supporting holder adhered to said substrate via a second adhesion layer, and said lens holder adhered to said supporting holder via a third adhesion layer.

5. The module structure of claim 1, wherein said first protrusion structure is located on a top surface of said supporting holder, and said second protrusion structure is located on a bottom surface of a side of said lens.

6. The module structure of claim 1, wherein said lens holder is a plastic piece or an actuator.

7. The module structure of claim 6, wherein said actuator includes a voice coil motor or a micro electro mechanical system.

8. The module structure of claim 1, wherein height of a bottom surface of said second protrusion structure is less than or equal to that of a top surface of said first protrusion structure.

9. The module structure of claim 1, wherein said substrate is a printed circuit board or a flexible printed circuit board.

10. The module structure of claim 9, further comprising a transparent material disposed on said supporting holder, substantially aligning to said sensing area.

11. The module structure of claim 10, wherein said supporting holder has a groove structure formed therein for allowing said chip disposed therein, and a through hole structure for exposing said sensing area of said chip.

12. The module structure of claim 10, wherein said supporting holder has a ring groove structure located at a side of said through hole structure for a transparent plate disposed thereon.

13. The module structure of claim 10, wherein said chip is adhered to said substrate via a first adhesion layer, said supporting holder adhered to said substrate via a second adhesion layer, and said lens holder adhered to said supporting holder via a third adhesion layer.

14. The module structure of claim 10, wherein said first protrusion structure is located on a top surface of said supporting holder, and said second protrusion structure is located on a bottom surface of a side of said lens.

15. The module structure of claim 10, wherein said lens holder is a plastic piece or an actuator.

16. The module structure of claim 15, wherein said actuator includes a voice coil motor or a micro electro mechanical system.

17. The module structure of claim 10, wherein height of a bottom surface of said second protrusion structure is less than or equal to that of a top surface of said first protrusion structure.

18. The module structure of claim 10, wherein said substrate is a printed circuit board or a flexible printed circuit board.

* * * * *